Patented June 15, 1926.

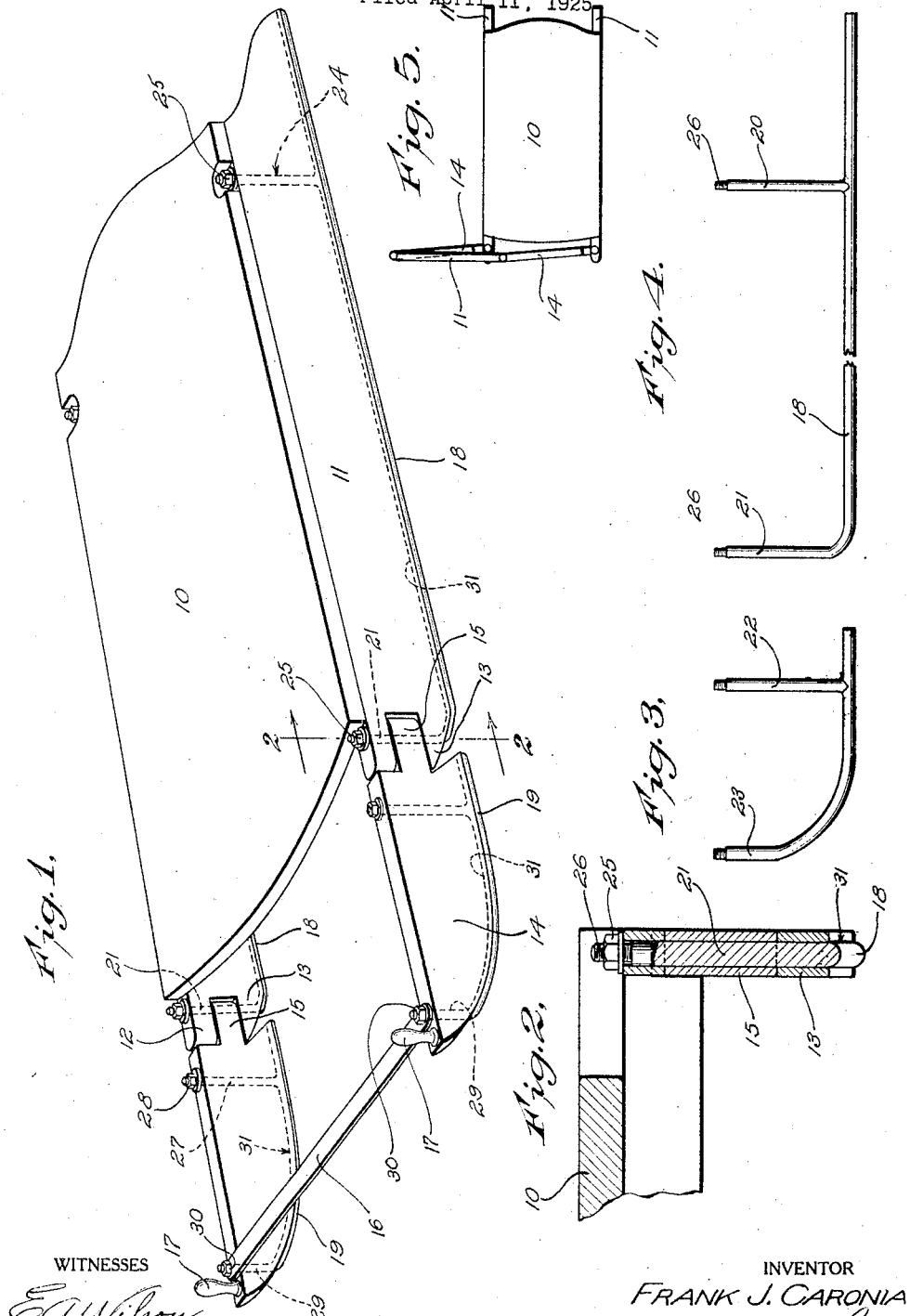

1,589,110

UNITED STATES PATENT OFFICE.

FRANK J. CARONIA, OF NEW YORK, N. Y.

SLED.

Application filed April 11, 1925. Serial No. 22,407.

This invention relates to sleds and has particular reference to an improvement in dirigible sleds.

One of the outstanding objects of the present invention is to provide a sled having movable runner sections for guiding and steering the same which runner sections are capable of adjustment to a position substantially at right angle to the remaining runner section whereby to act as a brake for bringing the sled to a sudden stop in an emergency.

In view of the strain necessarily impinged on the runner shoes in a sled of this type, it is therefore a further object of the present invention to provide an improved means for attaching the shoes to the runners which insures a rapid and lasting connection therebetween.

As a further object the invention comprehends a novel form of hinged connection between the movable and fixed runner sections.

The invention furthermore contemplates a dirigible sled which is comparatively simple yet strong and durable in its construction, inexpensive to manufacture and which is highly efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view of a sled constructed in accordance with the invention.

Fig. 2 is an enlarged detail sectional view therethrough taken approximately on the line 2—2 of Fig. 1.

Fig. 3 is a side view of one of the movable runner shoes removed.

Fig. 4 is a similar view of one of the fixed runner shoes removed.

Fig. 5 is a diagrammatic plan view showing the position of the movable runners when employed as a brake for stopping the sled.

Referring to the drawings by characters of reference 10 designates the body of the sled which is provided with fixed depending runners 11 formed at their forward end with vertically spaced hinge knuckles 12 and 13. A pair of movable runner sections 14 each having a rearwardly projecting knuckle 15 is provided and the knuckles 12, 13 and 15 are formed with vertically alined apertures to permit of a hinge connection of the movable runners with the fixed runners whereby the former may be swung laterally to allow for the steering of the sled. The movable runner sections 14 are further connected adjacent their free forward ends by a transverse connecting bar 16 for simultaneous movement and said runners may if desired be provided with hand grips 17 for effecting the swinging movements thereof. The hinged connection between the fixed or stationary runners 11 and the movable runner sections 14 also permits of the swinging of the latter to a position substantially at a right angle to the former to constitute a braking means for rapidly bringing the sled to a stop in an emergency. For this reason it is essential due to the strains and stresses impinged upon the runner shoes 18 and 19 to provide a rugged means of connection between the shoes and the runners. To this end the runner shoes 18 are provided with upstanding rigidly secured stems 20 and 21, and 22 and 23 on the shoes 19. The stems 20 of the runner shoes 18 extend through vertical bores or openings 24 in the runners 11 and the stems 21 extend through the alined apertures in the knuckles 12, 13 and 15 to constitute hinge pins in addition to means for ruggedly attaching the forward end of the runner shoes 18 in place. Nuts 25 are applied to the threaded upper terminals 26 of the stems. The stems 22 of the shoes of the runner sections 14 extend through vertical openings 27 in the runner sections 14 and have nuts 28 applied thereto. The stems 23 at the forward end of the runner shoe sections 19 extend through vertical apertures 29 at the forward end of the forward runner sections 14 and also through the apertured terminals of the connecting bars 16 after which the nuts 30 are applied thereto.

The runner shoes 18 and 19 which are preferably of circular cross section are received in semi-circular grooves 31 in the runner sections 18 and 19.

I claim:

1. A sled comprising a body, fixed runner sections on the body and relatively movable runner sections hinged to the fixed sections for lateral swinging movements to steer the sled and movable to a position at right angles to the fixed sections to constitute a brake for bringing the sled to a stop and a runner shoe mounted on the lower edge of each runner section having stems extending upwardly through the runner provided with threaded upper terminals and nuts applied to the threaded upper terminals, the stems at the forward ends of the fixed sections constituting the hinged connection between the fixed and movable sections, a connection between said movable sections for causing simultaneous lateral swinging movements thereof, the stems at the forward end of the movable sections extending through the connection between the movable sections to pivotally attach the same thereto.

2. A sled including a body, fixed runner sections depending from the opposite side edges of the body and formed with vertically spaced hinge knuckles at the forward end having alined apertures, relatively movable runner sections each having a rearwardly projecting hinge knuckle having a vertical aperture alining with the apertures in the hinge knuckles of the fixed runner section, a runner shoe at the lower edge of the fixed section having vertical stems extending upwardly through the runner section, the foremost stem protruding through the apertures in the knuckles to constitute a hinge pin, runner shoes on the movable runner sections having vertical stems extending upwardly therethrough, a fixed connecting bar having apertures in its opposite ends through which the foremost stem of the movable runner shoe extends, the upper ends of all of the stems having threaded terminals and nuts applied thereto.

3. A sled comprising a body having laterally spaced depending fixed runners, each formed at its forward end with vertically spaced apertured hinge knuckles, relatively movable runner sections each having a rearwardly projecting vertically apertured hinge knuckle at its rear end positioned between the vertically spaced hinge knuckles of the fixed runner sections, and a runner shoe underlying the fixed runners with the forward ends turned upwardly and extending through the apertured hinge knuckles of the fixed and movable runner sections to constitute a hinge pin therefor.

4. A sled comprising a body having laterally spaced depending fixed runners, each formed at its forward end with vertically spaced apertured hinge knuckles, relatively movable runner sections each having a rearwardly projecting vertically apertured hinge knuckle at its rear end positioned between the vertically spaced hinge knuckles of the fixed runner sections, and a runner shoe underlying the fixed runners with the forward ends turned upwardly and extending through the apertured hinge knuckles of the fixed and movable runner sections to constitute a hinge pin therefor, the said movable runner sections having a runner shoe underlying the same and extending upwardly through the forward end, and a connecting bar having apertured opposite ends mounted upon the upturned forward ends of said runner shoes to constitute a connection between the forward ends of the movable runners to impart simultaneous swinging movements thereto.

FRANK J. CARONIA.